United States Patent Office 3,228,885
Patented Jan. 11, 1966

3,228,885
NUCLEAR FUEL COMPOSITION COMPRISING URANIUM MONOCARBIDE DISPERSED IN IRON, CHROMIUM, OR IRON-CHROMIUM ALLOYS
Joseph Barta, Haifa, Israel, and Harry John Hedger, Chilton, Didcot, England, assignors to United Kingdom Atomic Energy Authority, London, England
Filed May 16, 1962, Ser. No. 195,075
Claims priority, application Great Britain, May 25, 1961, 18,909/61
7 Claims. (Cl. 252—301.1)

The present invention relates to nuclear fuel compositions, particularly those suitable for forming fuel elements for fast nuclear reactors. More particularly the invention is concerned with a composition including a carbide dispersed in a metallic matrix, such compositions being known as "cermets."

The object of the present invention is to provide a new or improved nuclear fuel composition.

According to the present invention, there is provided a nuclear fuel composition comprising a body in the form of a dispersion of uranium monocarbide in a disperse phase formed by iron, chromium or a chrome-iron alloy, said body being formed by casting and its melting point being below 1600° C.

If desired the body may contain a proportion of plutonium monocarbide.

It is important to have the temperature of melting of the composition relatively low, i.e. below 1600° C., as this enables the dispersion to be prepared by casting using normal refractories so as to give a material of low porosity. Such a process has clear advantages over fabrication by powder metallurgical methods.

Although it is desirable to have a relatively low melting temperature as stated above, no liquid phase should be present below 1000° C. so as to give an appreciable safety margin in use in a reactor having, for example, a can surface temperature of 700° C. and a fuel element centre temperature of 250° C.–800° C.

It is also possible to permit a low concentration of metallic uranium in the metallic phase but it is desirable to reduce this concentration so as to reduce irradiation damage to the metallic phase and the risk of diffusion of uranium metal through the composition and possibly through the can containing the composition.

In order that the invention may more readily be understood, reference should now be made to the accompanying drawings, wherein.

Figure 1:
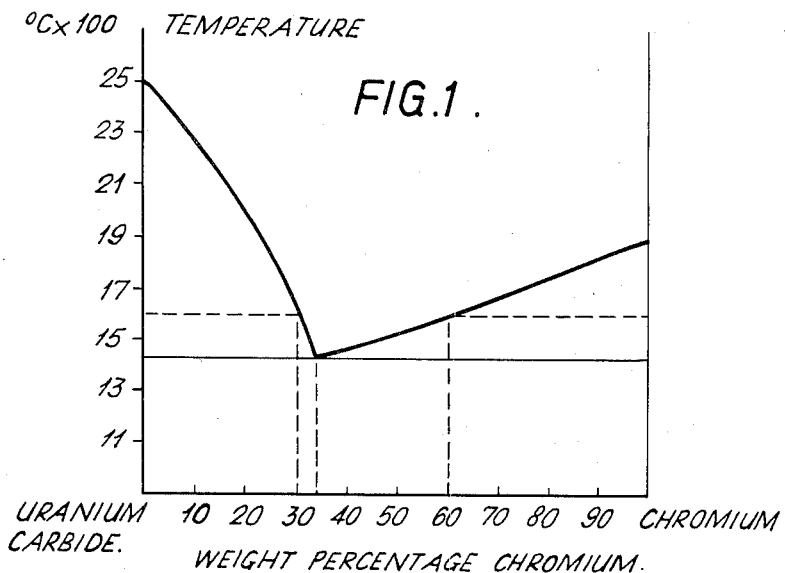
FIG. 1 is a phase diagram for the system uranium monocarbide-chromium.
Figure 2:
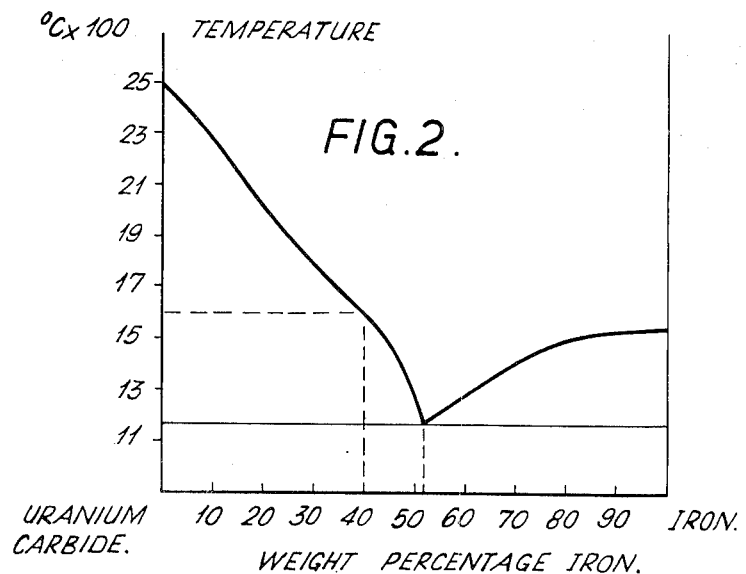
FIG. 2 is a phase diagram for the system uranium monocarbide-iron.

In these phase diagrams the melting points of uranium monocarbide, chromium and iron are taken as 2500° C., 1880° C., and 1535° C., respectively.

It will be seen that in both these systems the liquidus temperature is above 1000° C., being 1435° C. in respect of the chromium system and 1170° C. in respect of the iron, the eutectic compositions containing 34% and 51.5% by weight of chromium and iron respectively. Thus all compositions satisfy the minimum melting temperature requirements set out above.

Having regard to the requirement, set out above, that the composition should melt below 1600° C., it will be seen (from the dotted lines on the drawings) that compositions containing from 30% to 60% by weight of chromium or above 40% by weight of iron are suitable. Calculation shows therefore that suitable compositions are those containing from 12 to 25 atoms percent of uranium (as carbide), the remainder being chromium or up to 20 atoms percent of uranium (as carbide), the remainder being iron.

However, if the fuel is to be used in a fast neutron reactor the concentration of uranium in the composition should be as high as possible and at least 4.26 gms./cc. in order to achieve the required uranium density in the fuel.

Moreover, if regard is had to the necessity to keep low the uranium metal content of the metallic phase, it is necessary to introduce the further limitation that in the compositions the ratio of carbon to uranium is not less than 0.8. Thus these conditions are met by compositions containing:

(a) Chromium-uranium-carbon; uranium 15 to 27 atoms percent; carbon 12 to 25 atoms percent.
(b) Iron-uranium-carbon; uranium 14 to 21.5 atoms percent; carbon 12 to 20 atoms percent.

A proportion, for example up to 50% but preferably less than 30% by weight, of the uranium may be replaced by plutonium, but at least in the case where the metallic constituent is iron the uranium is necessary to stabilize the plutonium content.

The chromium-based composition tends to be hard and brittle whilst the iron-based composition does not have a high oxidation resistance; the use of a chrome-iron alloy as the metallic phase reduces both these disadvantages. Conventional alloying additions, such as silicon to give increased oxidation resistance or molybdenum and tungsten to give increased strength, are also possible, and it may even be possible to add a minor proportion of nickel although normally uranium monocarbide reacts with nickel.

Above the melting point, the liquids are completely miscible to give a true solution, but there is very limited solid solubility so that the carbide content appears as a dispersion in a continuous matrix phase. Since the bodies are produced by casting, the density is normally in excess of 98% of the theoretical value.

We claim:
1. A nuclear fuel composition comprising essentially a cast body in the form of a dispersion of uranium monocarbide in chromium and consisting of:
   uranium 15 to 27 atoms percent
   carbon 12 to 25 atoms percent
   carbon/uranium atomic ratio not less than 0.8, chromium remainder.
2. A nuclear fuel composition comprising essentially a cast body in the form of a dispersion of uranium monocarbide in iron and consisting of:
   uranium 14 to 21.5 atoms percent
   carbon 12 to 20 atoms percent
   carbon/uranium atomic ratio—not less than 0.8, iron remainder.
3. A nuclear fuel composition having a melting point not exceeding about 1600° C. and comprising a cast body in the form of a dispersion of uranium monocarbide in a disperse phase selected from the group consisting of iron, chromium and binary alloys thereof wherein when the disperse phase is iron the cast body contains in excess of 40% by weight of iron, the rest uranium monocarbide, and when the disperse phase is chromium the cast body contains between 30% and 60% by weight of chromium, the rest uranium monocarbide.
4. The composition of claim 3 in which the atomic ratio of carbon to uranium is between 1:1 and 0.8:1.
5. The composition of claim 3 including alloying additions selected from the group consisting of silicon, molybdenum, tungsten and nickel in quantities insufficient to appreciably affect the melting point of the composition.
6. A nuclear fuel composition having a melting point not exceeding about 1600° C. and comprising a cast body in the form of a dispersion of a ceramic material consisting essentially of uranium monocarbide in admixture with up to 50% by weight of plutonium monocarbide, in a disperse phase selected from the group consisting of iron, chromium and binary alloys thereof wherein when the disperse phase is iron, the cast body contains in excess of 40% by weight of iron, the rest the ceramic material, and when the disperse phase is chromium the cast body contains between 30% and 60% by weight of chromium, the rest the ceramic material.

7. A nuclear fuel composition having a melting point not exceeding about 1600° C. and comprising a cast body in the form of a dispersion of a ceramic material consisting essentially of uranium monocarbide in admixture with up to 30% by weight of plutonium monocarbide, in a disperse phase selected from the group consisting of iron, chromium and binary alloys thereof wherein when the disperse phase is iron, the cast body contains in excess of 40% by weight of iron, the rest the ceramic material, and when the disperse phase is chromium, the cast body contains between 30% and 60% by weight of chromium, the rest the ceramic material.

References Cited by the Examiner
UNITED STATES PATENTS

| | | | |
|---|---|---|---|
| 2,890,954 | 6/1959 | Chynoweth | 75—122.7 |
| 2,919,186 | 12/1959 | Colbeck | 75—122.7 |
| 3,096,263 | 7/1963 | Kingston | 176—69 |

FOREIGN PATENTS

| | | |
|---|---|---|
| 580,917 | 8/1959 | Canada. |
| 857,009 | 12/1960 | Great Britain. |
| 886,915 | 1/1962 | Great Britain. |

OTHER REFERENCES

AEC Document BMI–1370, December 1959, pp. 5–7.
AEC Document NDA–2140–2, September 1959, p. 33.
1st Geneva Conference on Atomic Energy, 1955, vol. 9, pp. 198 and 199.
2nd Geneva Conference on Atomic Energy, September 1958, vol. 6, pp. 153 and 549.

LEON D. ROSDOL, *Primary Examiner.*

OSCAR R. VERTIZ, CARL D. QUARFORTH, *Examiners.*

R. W. MacDONALD, A. G. BOWEN, *Assistant Examiners.*